US009584981B2

(12) United States Patent
Noorshams et al.

(10) Patent No.: US 9,584,981 B2
(45) Date of Patent: Feb. 28, 2017

(54) METHOD AND APPARATUS FOR REAL-TIME, MOBILE-BASED POSITIONING ACCORDING TO SENSOR AND RADIO FREQUENCY MEASUREMENTS

(71) Applicant: QUALCOMM Incorporated, San Diego, CA (US)

(72) Inventors: Nima Noorshams, Fremont, CA (US); Payam Pakzad, Mountain View, CA (US); Ravi Palanki, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 14/470,626

(22) Filed: Aug. 27, 2014

(65) Prior Publication Data

US 2016/0066157 A1    Mar. 3, 2016

(51) Int. Cl.
*H04W 4/04* (2009.01)
*H04W 24/10* (2009.01)
(Continued)

(52) U.S. Cl.
CPC ............ *H04W 4/04* (2013.01); *G01C 21/206* (2013.01); *G01S 5/0263* (2013.01);
(Continued)

(58) Field of Classification Search
CPC ....... H04W 4/02; H04W 4/021; H04W 4/023; H04W 4/027; H04W 4/04; H04W 4/043;
(Continued)

(56) References Cited

U.S. PATENT DOCUMENTS 7,257,413 B2 *  8/2007  Sheynblat ............. G01S 5/0036
                                                          342/125
7,567,822 B2    7/2009  Hart et al.
(Continued)

FOREIGN PATENT DOCUMENTS

WO         9953838 A1    10/1999
WO     2013165391 A1    11/2013

OTHER PUBLICATIONS

PCT International Search Report and Written Opinion for International Application No. PCT/US2015/042888, mailed Dec. 3, 2015, 13 pages.

*Primary Examiner* — Michael Mapa
(74) *Attorney, Agent, or Firm* — Blakely Sokoloff Taylor & Zafman LLP

(57) ABSTRACT

Method, hardware, device, computer program, and apparatus for positioning mobile devices in unmapped locations based on motion sensor and radio frequency measurements are described. A reference radio signal is received from a transmitter with an unknown absolute position and a reference range measurement is calculated. Mobile device motion sensor data is used to estimate a relative position of the mobile device. A sample radio signal is received from a transmitter with an unknown absolute position and a sample range measurement is calculated. The reference range measurement and the sample range measurement are compared. The estimated motion sensor based position is adjusted according to the result of the comparison.

44 Claims, 8 Drawing Sheets

(51) Int. Cl.
*H04W 4/02* (2009.01)
*H04W 4/00* (2009.01)
*G04C 21/20* (2006.01)
*G01S 5/02* (2010.01)
*G01C 21/20* (2006.01)

(52) U.S. Cl.
CPC ........... *G01S 5/0294* (2013.01); *H04W 4/008* (2013.01); *H04W 4/023* (2013.01); *H04W 4/027* (2013.01); *H04W 24/10* (2013.01)

(58) Field of Classification Search
CPC ..... H04W 4/008; H04W 24/10; H04W 64/00; G01S 5/00; G01S 5/02; G01S 5/0252; G01S 5/0278; G01S 5/0284; G01S 5/0294; G01S 5/14
USPC ........................ 455/404.2, 414.2, 456.1–457
See application file for complete search history.

(56) References Cited

U.S. PATENT DOCUMENTS

| | | | |
|---|---|---|---|
| 2009/0054076 A1 | 2/2009 | Evennou et al. | |
| 2010/0130229 A1* | 5/2010 | Sridhara | G01S 19/49 455/456.1 |
| 2010/0159958 A1 | 6/2010 | Naguib et al. | |
| 2011/0256894 A1 | 10/2011 | Khandelia et al. | |
| 2013/0344886 A1 | 12/2013 | Jarvis et al. | |
| 2014/0004877 A1 | 1/2014 | Van Diggelen et al. | |
| 2015/0195682 A1* | 7/2015 | Lee | H04W 4/04 455/456.1 |
| 2015/0350849 A1* | 12/2015 | Huang | H04W 4/04 455/456.1 |
| 2016/0033265 A1* | 2/2016 | Le Grand | G01D 9/00 702/150 |

* cited by examiner

METHOD AND APPARATUS FOR REAL-TIME, MOBILE-BASED POSITIONING ACCORDING TO SENSOR AND RADIO FREQUENCY MEASUREMENTS

FIELD

The subject matter disclosed herein relates generally to mobile-based positioning, and more specifically to locating and mapping with sensor and wireless signal measurements.

BACKGROUND

Mobile devices may be equipped with satellite based navigation systems for determining position and providing navigation assistance. A global navigation satellite system (GNSS) such as, for example, the Global Positioning System (GPS) may send timing signals used by mobile devices to estimate the position of the mobile device. However, in some situations mobile devices may be unable to receive the satellite timing signals. For example, when a mobile device is indoors, in a canyon, in the shadow of tall buildings, or other environment that may block satellite signals. In such circumstances, sensor equipped mobile devices can perform pedestrian dead reckoning (PDR) to estimate the mobile device's position. However, accuracy is limited by magnetic disturbances inside structures, sensor precision, and other unknown variables such as device position, bias, and differences in stride. Additionally, PDR error from use of mobile device sensor data is typically magnified over time as every new positioning error is compounded with previous errors.

As an alternative to GNSS or PDR, mobile devices may determine positions by leveraging a predetermined reference map containing WiFi access point locations. The mobile device can determine its position by trilateration (i.e., referencing at least three separate WiFi access points) of WiFi signal strength and/or ranging to known values within the predetermined map. However, WiFi location information and predetermined reference maps may not always be available or reliable. Therefore, there is a need for a standalone, real-time positioning system run on the mobile device.

SUMMARY

Embodiments disclosed herein may relate to a method for performing mobile device positioning. The method includes receiving a reference radio signal from a transmitter with unknown absolute position, measuring at least one characteristic of the reference radio signal, and calculating a reference range measurement between the mobile device and the transmitter using the at least one characteristic of the reference radio signal. The method further includes receiving mobile device motion sensor data and estimating a position of the mobile device based on the mobile device motion sensor data. The method also includes receiving a sample radio signal from a transmitter with unknown absolute position, measuring at least one characteristic of the sample radio signal, and calculating a sample range measurement between the mobile device and the transmitter using the at least one characteristic of the sample radio signal. The method further includes comparing the reference range measurement to the sample range measurement and adjusting the estimated motion sensor based position according to a result of the comparison.

Embodiments disclosed herein may further relate to a mobile device including a processor and a storage device configurable to store instructions to perform mobile device positioning. The mobile device includes instructions to receive a reference radio signal from a transmitter with unknown absolute position, measure at least one characteristic of the reference radio signal, and calculate a reference range measurement between the mobile device and the transmitter using the at least one characteristic of the reference radio signal. The mobile device further includes instructions to receive mobile device motion sensor data and estimating a position of the mobile device based on the mobile device motion sensor data. The mobile device also includes instructions to receive a sample radio signal from a transmitter with unknown absolute position, measure at least one characteristic of the sample radio signal, and calculate a sample range measurement between the mobile device and the transmitter using the at least one characteristic of the sample radio signal. The mobile device further includes instructions to compare the reference range measurement to the sample range measurement and adjust the estimated motion sensor based position according to a result of the comparison.

Embodiments disclosed herein may also relate to an apparatus to perform mobile device positioning. The apparatus includes means for receiving a reference radio signal from a transmitter with unknown absolute position, means for measuring at least one characteristic of the reference radio signal, and means for calculating a reference range measurement between the mobile device and the transmitter using the at least one characteristic of the reference radio signal. The apparatus further includes means for receiving mobile device motion sensor data and means for estimating a position of the mobile device based on the mobile device motion sensor data. The apparatus also includes means for receiving a sample radio signal from a transmitter with unknown absolute position, measuring at least one characteristic of the sample radio signal, and means for calculating a sample range measurement between the mobile device and the transmitter using the at least one characteristic of the sample radio signal. The apparatus further includes means for comparing the reference range measurement to the sample range measurement and means for adjusting the estimated motion sensor based position according to a result of the comparison.

Embodiments disclosed herein may relate to a machine readable non-transitory storage medium with instructions to perform mobile device positioning. The medium includes instructions for receiving a reference radio signal from a transmitter with unknown absolute position, measuring at least one characteristic of the reference radio signal, and calculating a reference range measurement between the mobile device and the transmitter using the at least one characteristic of the reference radio signal. The medium further includes instructions for receiving mobile device motion sensor data and estimating a position of the mobile device based on the mobile device motion sensor data. The medium also includes instructions for receiving a sample radio signal from a transmitter with unknown absolute position, measuring at least one characteristic of the sample radio signal, and calculating a sample range measurement between the mobile device and the transmitter using the at least one characteristic of the sample radio signal. The medium further includes instructions for comparing the reference range measurement to the sample range measurement and adjusting the estimated motion sensor based position according to a result of the comparison.

Other features and advantages will be apparent from the accompanying drawings and from the detailed description.

DESCRIPTION

Figure 1:
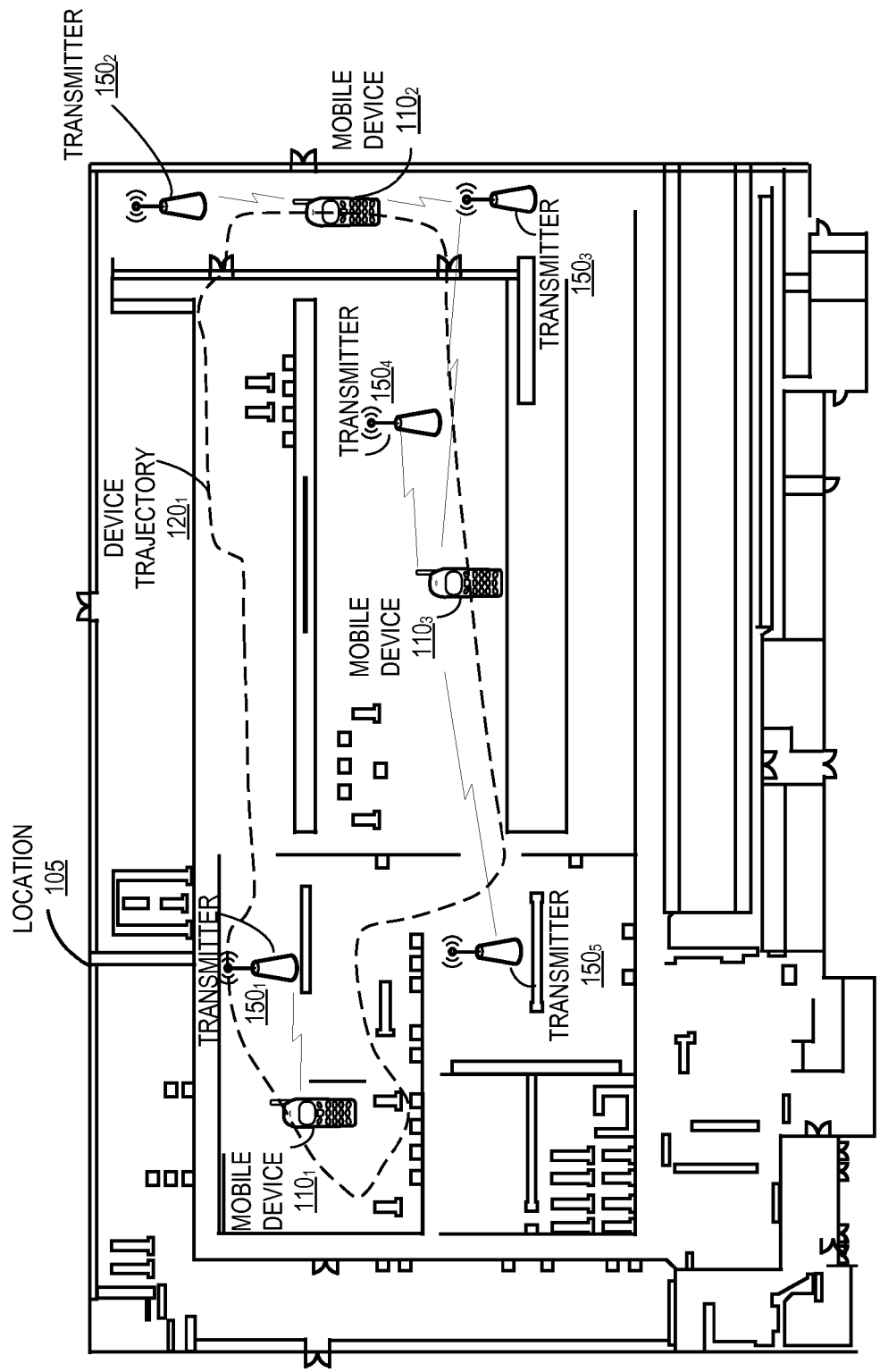
FIG. 1 is block diagram illustrating an exemplary operating environment in which embodiments of Sensor and Radio Positioning (SRP) may be practiced.

In one embodiment, a Sensor and Radio Positioning (SRP) module or engine enables a standalone real-time positioning system on a mobile device/station or access terminal without reliance on predetermined transmitter location maps. In some implementations, real-time can refer to providing positioning output in the order of milliseconds, and potentially microseconds. In one embodiment, SRP incorporates sensor and radio frequency measurements obtained by a mobile device to determine the mobile device's position. SRP implemented by a mobile device can track the mobile device's trajectory and relative position within a venue or environment (herein the venue or environment is referred to as a "location" where positioning and mapping occur). In some embodiments, SRP is initialized in environments where alternative positioning methods (for example, GNSS) are unavailable (for example, not installed, not an available feature of the mobile device or deactivated/suspended by an application or user), or unreliable (for example, satellite transmission signals are obscured).

SRP implemented at a mobile device can process, in real-time, motion data from device sensors to estimate a relative trajectory from an initialized starting position. Concurrently with processing motion data from the device sensors, SRP can process radio frequency (RF) signals from wireless transmitters (e.g., WiFi access points, Bluetooth devices, or other RF source). In one embodiment, at least one, some, or all of the wireless transmitters absolute locations (for example, within a mapped coordinate system) are unknown to the mobile device. For example, SRP may utilize wireless transmitters for positioning of the mobile device within a venue without determining the transmitter's specific location within the location (for example, without referencing a predetermined location map). The mobile device may identify nearby wireless transmitters by their broadcast identification (for example, media access control (MAC) address) and associate the respective RF signals of the wireless transmitters (herein referred to as "range measurements") with a relative position of the mobile device determined from the sensor data (herein referred to as "displacement estimates"). In one embodiment, SRP associates displacement estimates with the range measurements determined from wireless transmitters to estimate the relative position of wireless transmitters to the mobile device and/or to determine if sensor data positioning should be corrected or re-aligned.

In one embodiment, mobile device positions determined from the sensor data (for example, displacement estimates) are adjusted/corrected by referencing previously discovered transmitters and their respective range measurements. For example, in response to traversing a location, SRP may associate range measurements of discovered transmitters with a reference set of mobile positions within the location. In response to re-discovering a transmitter, SRP can determine if the current range measurement was detected in a prior iteration. If the current range measurement is the same or similar to a prior range measurement (e.g., within a threshold variance or difference), SRP can replace the current estimated mobile device position with the prior reference position associated with the respective reference range measurement.

In other embodiments, SRP can correct displacement estimates by comparing the change in range measurement from one point in time to a next point in time. For example, SRP can estimate the distance traveled by the mobile device with mobile sensors as well as radio range measurement calculations and correct for potential errors of the mobile sensor based positioning estimation with the range measurement calculations.

FIG. 1 is block diagram illustrating an exemplary operating environment in which embodiments of SRP may be practiced. In one embodiment, a device (for example, mobile device 110) moves within a location (for example, location 105). The location may be a venue, building, or structure, referred to herein as the location or indoor/enclosed environment. As used herein, the term "mobile device" refers to a device that may from time to time have a position that changes. Such changes in position may comprise changes to direction, distance, orientation, etc., as a few examples. The mobile device may have integrated positioning capability above and beyond SRP as described herein (e.g., WiFi positioning, sensors, GNSS, etc.) to determine the position of the mobile device at specified time intervals. In some embodiments, positioning capabilities other than SRP may become unavailable or are inaccessible and the mobile device can utilize SRP to determine mobile device positioning.

The mobile device 110 may initially be unable to determine the absolute position or existence of transmitters within the location. For example, the mobile device may not have access to both GNSS and a map of the location. In one embodiment, as the mobile device traverses the location, SRP discovers transmitters and performs range measurements to develop a SLAM map. The SLAM map may contain discovered transmitter's positions relative to points on a path or trajectory of the mobile device. SRP can store the SLAM map in memory of the mobile device.

The term "unknown" as used herein in connection with a position of a mobile device or a position of a wireless transmitter refers to a position that has yet to be measured or estimated with a level of accuracy sufficient for a given application (for example, for SRP to determine absolute location or coordinates within a map). Estimated or measured relative positions within several meters may be considered to be "known" relative positions, although the scope of claimed subject matter is not limited in this respect. In some embodiments, a mobile device or transmitter may initially have an "unknown" absolute and relative position. In response to the SRP's measuring of transmitter radio signals (for example, range measurements) relative to the current mobile device position, the transmitter's relative position status may become "known." SRP may determine relative position to the mobile device while the transmitter's absolute location as unknown. For example, SRP may determine the transmitter is 2 feet away from the mobile device while also not determining where the transmitter is mapped (for example, with x-y coordinates) within a network map or heatmap of the venue.

SRP can store the mobile device's trajectory (for example, device trajectory 120) within the mobile device to create and maintain a real-time simultaneous localization and mapping (SLAM) on the device (for example, a local map). For example, SRP can determine range measurements at the mobile device concurrently with updating an estimated or known position of the mobile device.

SRP may also store relative transmitter positions in the local map and update the relative transmitter positions as the mobile device traverses a location (for example, SLAM). For example, while updating the position of the mobile device, SRP can update a radio and/or WiFi map of the location (for example, relative transmitter locations $150_{1-5}$) from the range measurements. The mobile device 110 is illustrated in FIG. 1 at three distinct positions and points in time (as shown by illustrations $114_{1-3}$) in the proximity of the various transmitters $150_{1-5}$. For example, mobile device at $110_1$ may determine range measurements to nearby transmitter $150_1$, mobile device at $110_2$ may determine range measurements to nearby transmitters $150_2$ and $150_3$, mobile device at $110_3$ may determine range measurements to nearby transmitters $150_4$ and $150_4$. Additionally, at a time when GNSS and/or a location specific map are received, SRP may align the relative transmitter positions to the location specific map (for example, according to geographically referenced points).

In other embodiments, crowdsourcing of multiple independent mobile devices may enhance the available range and distance measurements available to SRP. For example, multiple independent mobile devices can perform SLAM for relative transmitter position within a location and a server may combine the SLAM data from the multiple independent mobile devices to form a central/global reference map of relative positions of transmitters within the location. Each mobile device may request a copy of the central/global reference map for use in mobile positioning.

SRP may estimate position and trajectory of a mobile device based on information gathered from various systems. One such system may comprise a wireless network compatible with one or more of the Institute of Electrical and Electronics Engineers (IEEE) 802.11 wireless local access network (WLAN) standards, which may also be referred to as a WiFi network. Such a network may include wireless transmitters/receivers (for example, transmitters $150_{1-5}$) often referred to as "access points," or APs, for example. Accuracy or availability of traditional mobile device positioning systems may depend, at least in part, on wireless access point mapping via trilateration, wherein information related to wireless access points including estimated positions may be stored in a database or other storage type on a server. A position estimate, which may also be referred to as a position "fix," for a mobile device may be obtained based at least in part on distances or ranges measured from the mobile device to one or more wireless transmitters, and may also be based at least in part on knowledge of the positions of the one or more wireless transmitters. In one embodiment, SRP may not have access to a wireless AP database and may not have access to absolute AP locations/coordinates.

SRP may interface with wireless communication components including, for example, cellular communication systems, wireless local area networks, or other types of wireless communication systems. Wireless communication of the mobile device may employ one or more wireless transmitters/receivers that may be referred to as "base stations" or "access points," for example. As used herein, the terms "base station" and "access point," represent example types of wireless-transmitters, although the scope of claimed subject matter is not limited in this respect. As used herein, the term "transmitter" is meant to include any transmitter or transmitter/receiver of wireless signals compatible with any type of wireless communication system. For example, a transmitter may be Bluetooth device transmitting over a protocol defined by the trade organization Bluetooth SIG.

The term "transmitter" is also meant to include any wireless communication station or device utilized to facilitate communication in a wireless communications system, such as, for example, a cellular network, although the scope of claimed subject matter is not limited in this respect. An example type of wireless transmitter utilized in a cellular network may be referred to as a base station. In another aspect, a wireless transmitter may comprise a femtocell, utilized to extend cellular telephone service into a business or home, for example. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet. In another aspect, wireless transmitters may be included in any of a range of electronic device types. In an aspect, a wireless transmitter may comprise a WLAN access point (AP), for example. Such a WLAN may comprise a network that is compatible with one or more of the IEEE 802.11x standards, in an aspect, although the scope of claimed subject matter is not limited in this respect. Additionally, the use herein of the term "transmitter" in describing a device does not limit that device's function to transmitting only. For example, base stations and access points are typically capable of both transmitting and receiving wireless signals.

Figure 2:
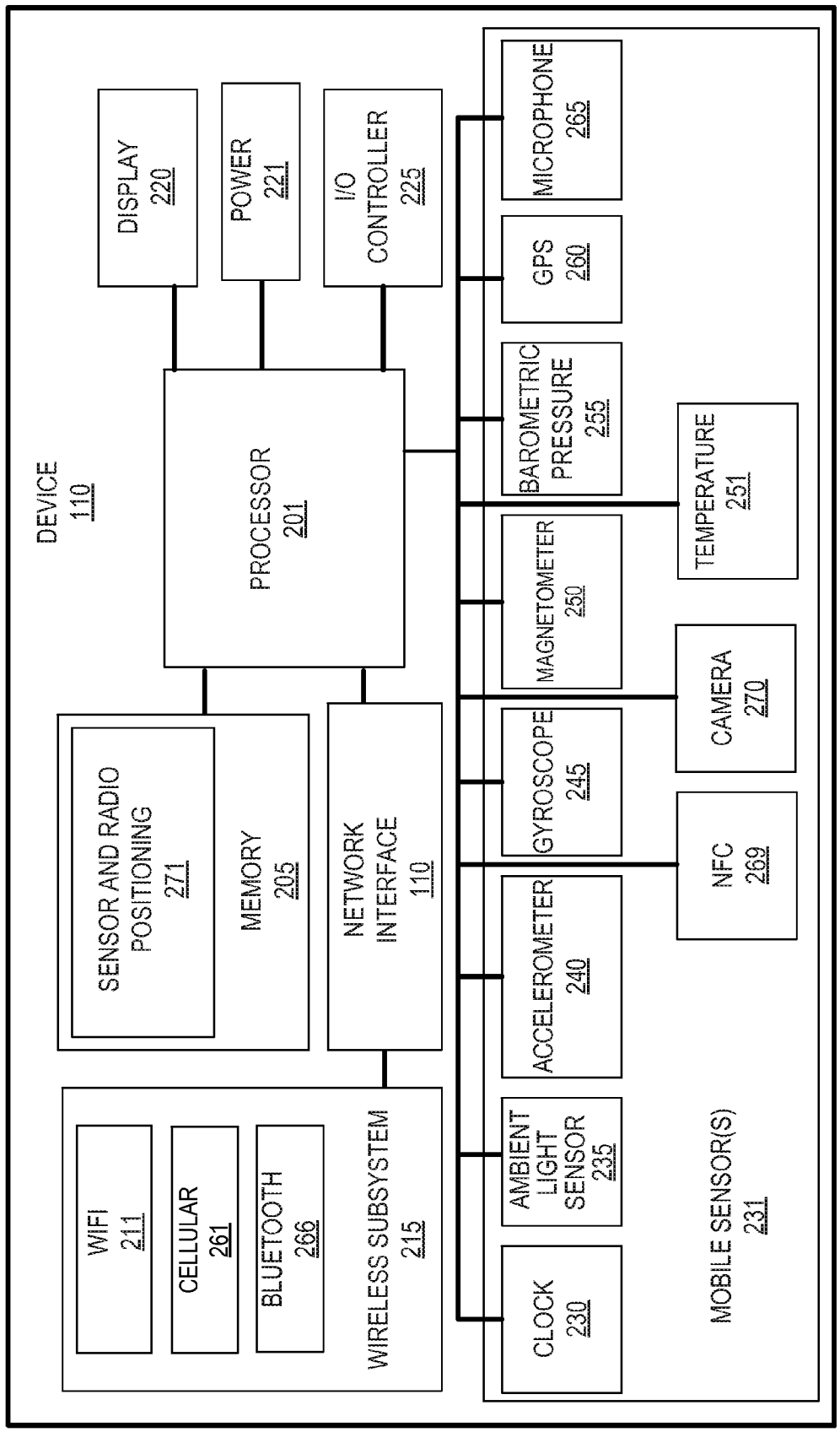
FIG. 2 is block diagram illustrating an exemplary mobile device in which embodiments SRP may be practiced.

FIG. 2 is block diagram illustrating an exemplary mobile device in which embodiments SRP may be practiced. The system may be a mobile device (for example, the mobile device 110), which may include one or more processors 201, a memory 205, I/O controller 225, and network interface 210. Mobile device 110 may also include a number of device sensors coupled to one or more buses or signal lines further coupled to the processor 201. It should be appreciated that device 110 may also include a display 220, a user interface (e.g., keyboard, touch-screen, or similar devices), a power device 221 (for example, a battery), as well as other components typically associated with electronic devices. In some embodiments, mobile device 110 may be a non-mobile device.

Mobile device 110 can include sensors such as a clock 230, ambient light sensor (ALS) 235, accelerometer 240, gyroscope 245, magnetometer 250, temperature sensor 251, barometric pressure sensor 255, compass, proximity sensor, near field communication (NFC) 269, and/or Global Positioning Sensor (GPS or GNSS) 260. As used herein the microphone 265, camera 270, and/or the wireless subsystem 215 (Bluetooth 266, WiFi 211, cellular 261) are also considered sensors used to analyze the environment (for example, position) of the device.

Memory 205 may be coupled to processor 201 to store instructions for execution by processor 201. In some embodiments, memory 205 is non-transitory. Memory 205 may also store one or more engines or modules to implement embodiments described below. Memory 205 may also store data from integrated or external sensors. In addition, memory 205 may store application program interfaces (APIs) for accessing SRP. In some embodiments, SRP functionality is implemented in memory 205. In other embodiments, SRP functionality is implemented as a module separate from other elements in the device 110. The SRP module may be wholly or partially implemented by other elements illustrated in FIG. 2, for example in the processor 201 and/or memory 205, or in one or more other elements of the device 110. Additional details regarding implementation of SRP functionality are described below.

Network interface 210 may also be coupled to a number of wireless subsystems 215 (e.g., Bluetooth 266, WiFi 211, Cellular 261, or other networks) to transmit and receive data streams through a wireless link to/from a wireless network, or may be a wired interface for direct connection to networks (e.g., the Internet, Ethernet, or other wireless systems). The mobile device may include one or more local area network transceivers connected to one or more antennas. The local area network transceiver comprises suitable devices, hardware, and/or software for communicating with and/or detecting signals to/from WAPs, and/or directly with other wireless devices within a network. In one aspect, the local area network transceiver may comprise a WiFi (802.11x) communication system suitable for communicating with one or more wireless access points.

Mobile device 110 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc. In conventional digital cellular networks, position capability can be provided by various time and/or phase measurement techniques. For example, in CDMA networks, one position determination approach used is Advanced Forward Link Trilateration (AFLT). Using AFLT, a server may compute its position from phase measurements of pilot signals transmitted from a plurality of base stations.

Thus, mobile device 110 may be a: wireless device, cell phone, personal digital assistant, mobile computer, wearable device (e.g., head mounted display, watch, glasses, etc.), robot navigation system, tablet, personal computer, laptop computer, or any type of device that has processing capabilities. As used herein, a mobile device may be any portable, or movable device or machine that is configurable to acquire wireless signals transmitted from one or more wireless communication devices or networks. Thus, by way of example but not limitation, mobile device 110 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at mobile device 110. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

The mobile device may communicate wirelessly with a plurality of APs using RF signals (e.g., 2.4 GHz, 3.6 GHz, and 4.9/5.0 GHz bands) and standardized protocols for the modulation of the RF signals and the exchanging of information packets (for example, IEEE 802.11x). By extracting different types of information from the exchanged signals, and utilizing the layout of the network (i.e., the network geometry) the mobile device may determine position within a predefined reference coordinate system.

It should be appreciated that embodiments described herein may be implemented through the execution of instructions, for example as stored in the memory 205 or other element, by processor 201 of device and/or other circuitry of device and/or other devices. Particularly, circuitry of device, including but not limited to processor 201, may operate under the control of a program, routine, or the execution of instructions to execute methods or processes in accordance embodiments described herein. For example, such a program may be implemented in firmware or software (e.g. stored in memory 205 and/or other locations) and may be implemented by processors, such as processor 201, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device 110 itself and/or some or all of the functions, engines or modules described herein may be performed by another system connected through I/O controller 225 or network interface 210 (wirelessly or wired) to device. Thus, some and/or all of the functions may be performed by another system and the results or intermediate calculations may be transferred back to device. In some embodiments, such other device may comprise a server configured to process information in real time or near real time. In some embodiments, the other device is configured to predetermine the results, for example based on a known configuration of the device. Further, one or more of the elements illustrated in FIG. 2 may be omitted from the device 110. For example, one or more of the sensors 231 may be omitted in some embodiments.

Figure 3:
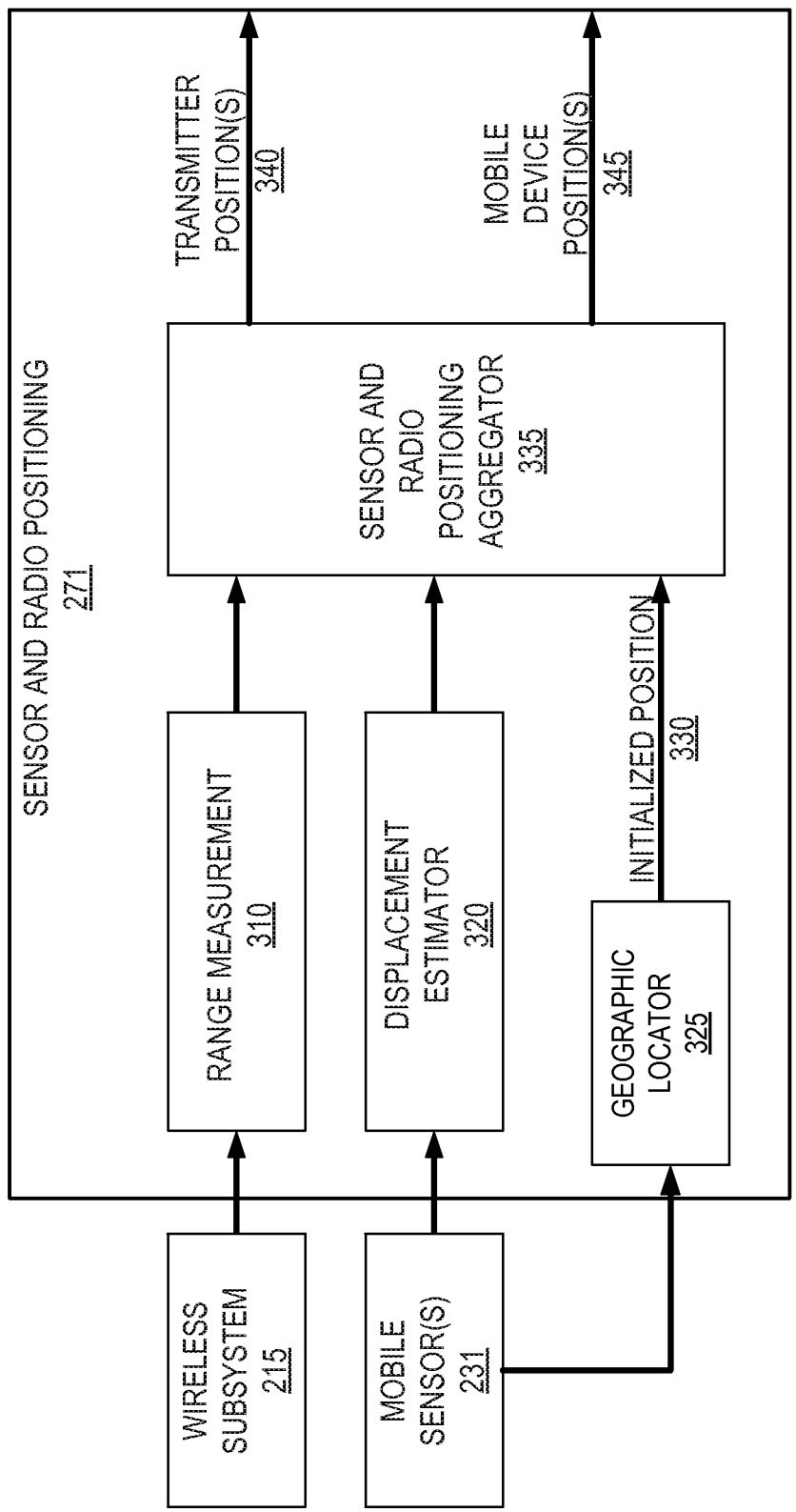
FIG. 3 is a block diagram illustrating a SRP module, in one embodiment.

FIG. 3 is a block diagram illustrating a SRP module, in one embodiment. In one embodiment, SRP may have multiple engines, modules, or components to provide accurate positioning of the mobile device and associated transmitters within a location. SRP may include a wireless subsystem (for example, wireless subsystem 215, that may include a radio scanner) to receive and interpret radio frequency signals within a location. A range measurement module (for example, range measurement 310) can process the radio signals captured by the radio scanner. For example, range measurements may be based at least in part on a variety of measured radio signal characteristics, including for example, time of arrival (TOA), time difference of arrival (TDOA), round trip time (RTT), or received signal strength indicator (RSSI), or any combination thereof. In one embodiment, SRP may include one or more mobile sensors (for example, sensor(s) 231). The mobile sensors may measure one or more of motion and orientation, and are described in greater detail with regards to FIG. 2.

A displacement estimator (for example, displacement estimator 320) can receive mobile sensor data (for example, raw sensor data) and can determine relative position of the mobile device from a prior position of the mobile device. In one embodiment, the output of the displacement estimator is a displacement vector derived from the sensor data of one or more sensors 231. In another embodiment, the displacement estimator outputs an absolute position (for example, coordinates) of the mobile device, such as a position in an x, y, z or other coordinate system.

In one embodiment, SRP may include a geographic locator (for example, geographical locator 325) to determine an initial starting position for SLAM. For example, the geographic location may be a GNSS coordinate result representing an actual position fix determined as a result of a satellite transmission at the start of trajectory tracking. In some embodiments, the geographic location is based upon an arbitrary initial starting position (for example, 0, 0, 0 in a x, y, z coordinate system) to initialize tracking (for example, relative positioning). In some embodiments, the mobile device may prompt a user to enter actual or approximate position data or coordinates. For example, the mobile device may prompt a user to use an application to "check in" to a location or define a starting position by taking a picture, scanning a quick response (QR) code having a known location, or other methods for self-reporting position. The geographic locator can pass the initialized position data on to the SRP aggregator.

In one embodiment, SRP may include an aggregator (for example, SRP aggregator 335) to process the range measurements, displacement estimates, and initialize position data. The SRP aggregator may output transmitter position(s) 340 and mobile device position(s) 345. For example, the mobile device may follow a trajectory with locations ($x_1$, $x_2$, ..., $x_T$) in a location having n transmitters (for example, APs) at unknown absolute locations ($y_1$, $y_2$, ..., $y_n$). In one embodiment $t_i^k$ denotes range measurements (based on, at least in part, for example, RSSI, RTT, TDOA, TOA, other measurements, or any combination thereof) from the ith transmitter to the mobile device at time k, for i=1, 2, ..., n, and k=1, 2, ..., T. The mobile device displacement vector estimate between time instances k and k+1 is $d^k$, for k=1, 2, ..., T. The inputs to the SPR aggregator may be the initial location of the mobile device (for example, $x_1$), the received range measurements (based on, at least in part, for example, RSSI, RTT, TDOA, TOA, other measurements, or any combination thereof) $\{t_i^k\}_{i=1 \ldots n; k=1 \ldots T}$, and the motion information from the mobile device sensor(s) $\{d^k\}_{k=1 \ldots T}$. In one embodiment, the output of the SRP aggregator is the position of mobile device at various times on the trajectory ($x_1$, $x_2$, ..., $x_T$) and the position of transmitters ($y_1$, $y_2$, ..., $y_n$).

Figure 4:
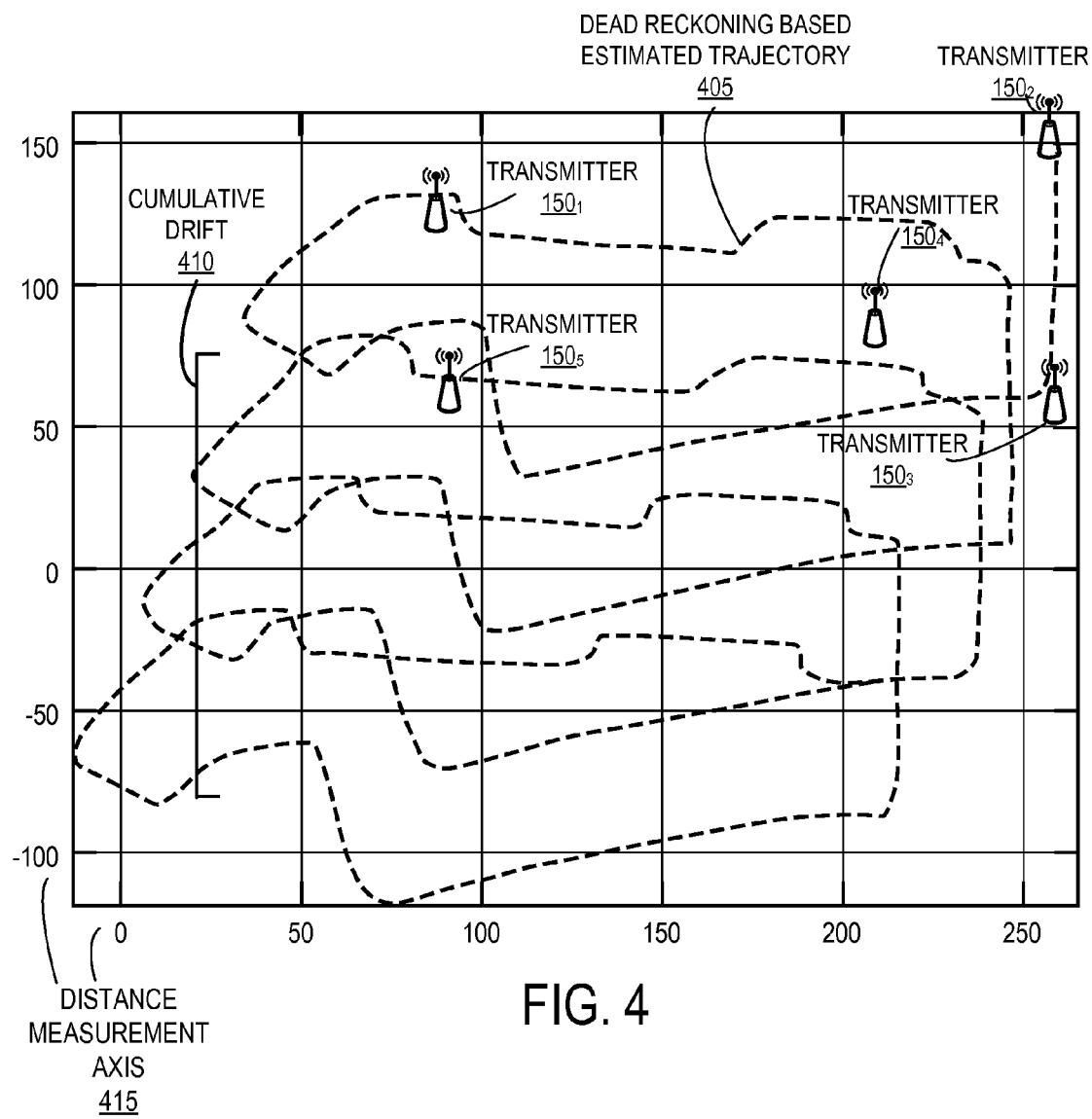
FIG. 4 illustrates dead reckoning error accumulation while tracking a mobile device, in one embodiment.

FIG. 4 illustrates Pedestrian Dead Reckoning (PDR) error accumulation while tracking a mobile device, in one embodiment. As introduced above, a mobile device (for example, mobile device 110) referencing sensor based dead reckoning for positioning may experience drift over time (for example, cumulative drift 410). The longer a mobile device relies solely on sensor based PDR estimations, the greater the cumulative error that is carried over to the subsequent mobile device position estimates. For example, as illustrated, as the mobile device proceeds along dead reckoning based estimated trajectory 405, the path drifts further from transmitters $150_{1-5}$. In one embodiment, SRP leverages the radio signals detected from transmitters visible to the mobile device to re-align or correct for errors (for example, cumulative drift 410) in the PDR based trajectory estimates.

Figure 5:
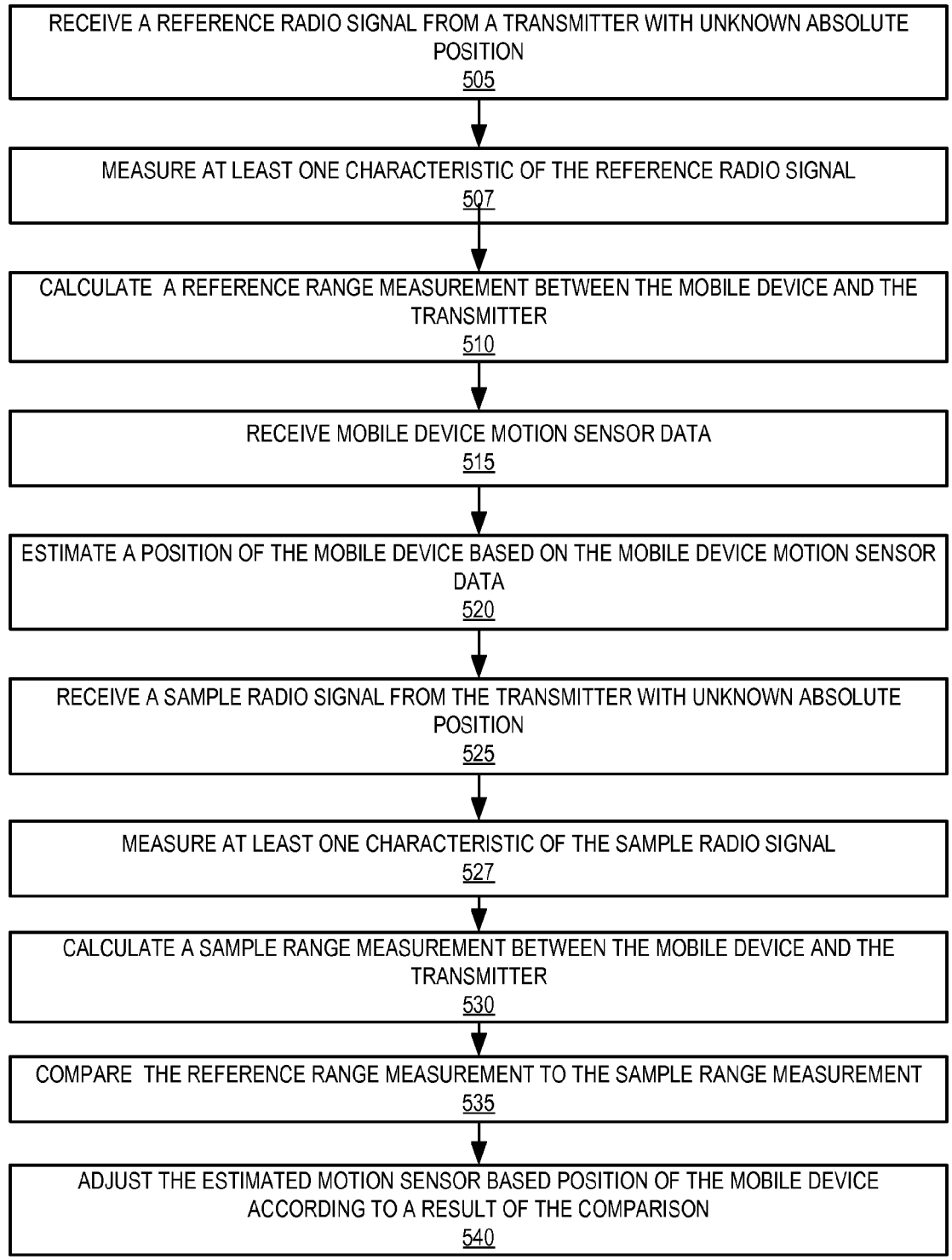
FIG. 5 is a flow diagram illustrating a method for performing SRP, in one embodiment.

FIG. 5 is a flow diagram illustrating a method for performing SRP, in one embodiment. At block 505, the embodiment (for example, SRP) receives a reference radio signal from a transmitter with unknown absolute position. The reference radio signal may be a signal received by a mobile device and saved to local memory of the device for comparison with subsequent sample radio signals. For example, while a mobile device traverses a location it may save discovered radio signals associated with one or more positions (for example, positions calculated from mobile device motion sensors). As described herein, transmitters initially discovered may have unknown absolute locations (for example, the transmitter location within a predetermined map or global coordinate system is unknown). In some embodiments, some or all of the discovered radio signals from transmitters are saved as reference radio signals. In response to measuring the reference radio signals, their respective range measurements may also be saved to the mobile device as reference range measurements associated with their respective transmitter. As the mobile device determines additional/current displacement estimates and range measurements, a local map (for example, SLAM map) that includes relative positions of transmitters to a mobile device's estimated position may be created and maintained on the mobile device.

At block 507, the embodiment measures at least one characteristic of the reference radio signal. For example, SRP may measure RSSI, RTT, TDOA, TOA, or other characteristics of radio signals, or any combination thereof. In one embodiment, the measured characteristics are saved to the mobile device and associated with their respective wireless transmitter. The measured characteristics may also be associated with a current estimated mobile device position.

At block 510, the embodiment calculates, in response to measuring the reference radio signal, a reference range measurement between the mobile device and the transmitter. For example, SRP can process the RSSI, RTT, TDOA, TOA, or other characteristics determined at block 507 and determine a distance from the mobile device to the wireless transmitter. The range measurement may represent a physical distance between the measuring mobile device and the wireless transmitter. In some embodiments, a reference range measurement refers to a range measurement obtained by a mobile device at a given time, and subsequent range measurements, for example sample range measurements, may follow that can allow for updating the mobile device's position relative to the reference range measurement.

At block 515, the embodiment receives mobile device motion sensor data. For example, motion sensor data received from one or more sensor data feeds of the mobile device (for example, mobile sensors 231).

At block 520, the embodiment estimates a position of the mobile device based on the mobile device motion sensor data. In one embodiment, the mobile device may determine displacement (for example, distance and direction) estimates from a prior mobile device position. For example, SRP may determine displacement estimates by dead reckoning calculations from a prior mobile device position. In some embodiments, the prior mobile device position may be an initialized arbitrary position (for example, all zeros or some other predetermined coordinate position) or a mobile device's position derived from another source other than mobile device motion sensors (e.g., global positioning satellite signals, a prior indoor position fix based on APs with known positions, or from user input).

At block 525, the embodiment receives a sample radio signal from the transmitter with unknown absolute position. For example, sample radio signals may represent radio signals received at a current moment in time as a mobile device traverses an environment (for example, the sample may be a current or real-time updated radio signal).

At block 527, the embodiment measures at least one characteristic of the sample radio signal. For example, SRP (for example, implemented at a mobile device) may measure RSSI, RTT, TDOA, TOA, or other characteristics of the sample radio signal, or any combination thereof. In one embodiment, measured characteristics are saved to the memory of the mobile device and associated with their respective wireless transmitter. The saved characteristics may also be associated with a current estimated mobile device position.

At block 530, the embodiment calculates, in response to measuring the sample radio signal, a sample range measurement between the mobile device and the transmitter. For example, SRP can process RSSI, RTT, TDOA, TOA, or other characteristics of the sample radio signal determined at block 527 to determine a range measurement to the wireless transmitter. The range measurement may represent a physical distance between the measuring mobile device and the wireless transmitter broadcasting the sample radio signal.

At block 535, the embodiment compares the reference range measurement to the sample range measurement. The measurements may be a physical distance between a wireless transmitter and a mobile device as described above. In one embodiment, the comparison determines whether the reference and sample range measurements are within a threshold difference or variation from each other (for example, are approximated as representing the same range measurement value likely to have been measured from a same position). In some embodiments, instead of, or in addition to determining whether the reference and sample range measurements are equivalent within a threshold, SRP compares the reference and sample range measurements to determine the change in estimated position. For example, SRP can determine the distance a mobile device has travelled from the difference between the reference and sample range measurements. In other words, the difference between the reference and sample range measurements can be utilized to determine a distance travelled from the time the reference range measurement was obtained to the time the sample range measurement was obtained. In some embodiments, instead of or in addition to comparing range measurements, one or more measurement characteristics of the radio signals from the wireless transmitter are compared. For example, a reference RSSI from a wireless transmitter may be compared to a current/sample RSSI from the same wireless transmitter to determine whether the two RSSI measurements are within a threshold match.

At block 540, the embodiment adjusts the estimated motion sensor based position of the mobile device according to a result of the comparison. Mobile device position determined from the sensor data may be error-corrected (for example, to correct PDR drift errors) by referencing previously discovered transmitters and their respective range measurements. In one embodiment, if the comparison reveals that the sample and reference range measurement are approximately the same (for example, within a threshold), a reference mobile device position associated with the reference range measurement can replace the current estimated mobile device position. For example, when SRP determines the match is likely to indicate the mobile device is re-visiting, or remaining in, a previously measured location (for example, within a threshold difference), the prior mobile device position is used to replace the current mobile device position.

In one embodiment, if the comparison reveals that the sample and reference range measurement are not approximately equivalent, the reference and sample range measurements are further compared/analyzed to determine the difference between the sample and reference range measurements. For example, PDR can adjust the current estimated mobile device position to reflect the distance traveled as indicated by the difference between the sample and reference range measurements. In some embodiments, the sample radio signal refers to a radio signal that will be used to potentially update the mobile device's position relative to a position calculated, in part, by using a previous radio signal, for example a reference radio signal.

Figure 6:
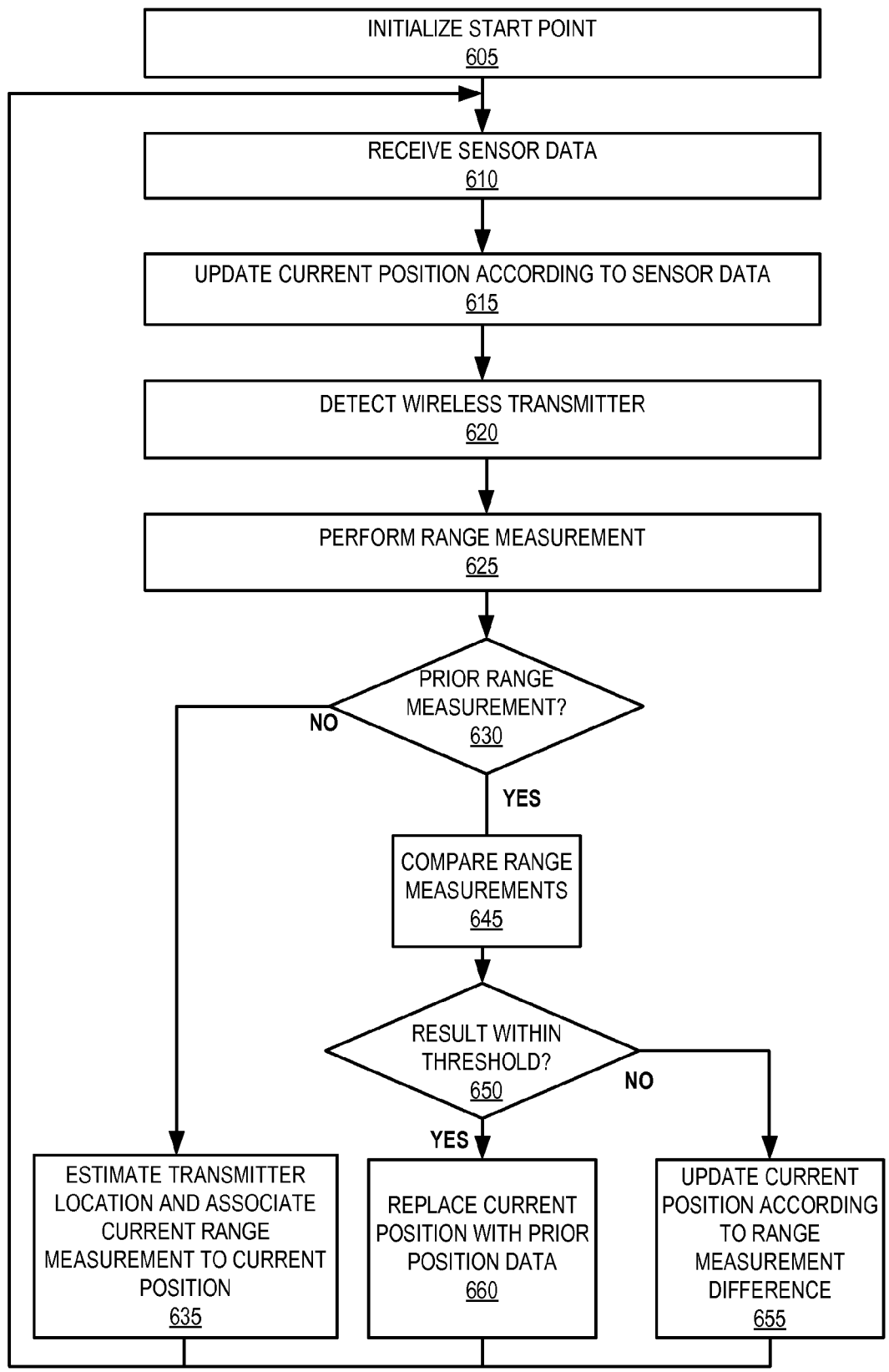
FIG. 6 is a flow diagram illustrating a method for performing SRP, in another embodiment.

FIG. 6 is a flow diagram illustrating a method for performing SRP, in another embodiment. At block 605, the embodiment (for example, SRP) initializes a start point/position. SRP may initialize PDR and SLAM to an arbitrary coordinate or an actual coordinate if known (e.g., a satellite based coordinate, or coordinate derived from a user entered position). For example, in response to losing satellite navigation capability, the last known satellite coordinates may be the start position of sensor based positioning. In some embodiments the starting position may be obtained from user input (e.g., actual coordinates or other representation of the mobile device position) and the user input is the start position recorded or saved to the mobile device. SRP may utilize the start position to calculate displacement estimates to a next or subsequent mobile device position. From the displacement estimates, SRP may further determine coordinates (for example, within a local SLAM or other map) of the mobile device.

In some embodiments, SRP receives an updated position (for example, also described herein as alignment data) of the mobile device determined from a source other than PDR or transmitter radio signal measurements. For example, SRP may receive an updated position from GNSS, user input, indoor positioning system (for example, an alternative indoor positioning system that does not reference SRP data), or other source of positioning information. For example, the alternative indoor positioning system may utilize magnetic fields, visible light communication, or other methods with landmarks or beacons to determine indoor position of the mobile device. The updated position may provide a geographically referenced point or position along a device's trajectory. For example, although GNSS may be generally unavailable in an enclosed or indoor environment, cover or obstructions may be lifted when a mobile device is near windows or openings that allow receipt of GNSS signals. In response to receiving alignment data containing a potentially more accurate positioning fix, SRP can align the local map maintained by the mobile device (for example, SLAM) to reference the updated position received from the alignment data.

To illustrate an example of updating positioning with alignment data, if the initial starting coordinates are arbitrarily initialized to x-y coordinates (0,0) and the displacement estimates indicate the mobile device as traveling 2 positions in the x-direction and 4 positions in the y-direction, an updated current position of may be estimated as (2,4). Next, alignment data from GNSS signals indicate the actual current coordinate is for example (3,6), the starting coordinate (0,0) may be retroactively adjusted to (1,2). Alternatively, a new starting point, or initialized position may be set to the updated coordinate (3,6). Therefore, future displacement estimations can take into account updated position from alignment data instead of the arbitrarily initialized starting position.

In some embodiments, SRP adjustment of estimated mobile device coordinates causes an equal relative adjustment to all other coordinates in the map or system such that an aligned map of all discovered transmitters is created. In some embodiments, SRP references the alignment data to align the mobile device position to a reference map (for example, a map with coordinates and/or landmarks for a location), which may be different than the local SLAM map maintained by the mobile device.

At block 610, the embodiment receives sensor data. Sensor data may originate from one or more of the mobile device sensors (for example, sensors 231 as described above). For example, SRP may receive accelerometer 240 data, magnetometer 250 data, gyroscope 245 data, or any combination thereof. Data received from sensors may be raw sensor data or data processed into a format appropriate for the particular SRP implementation.

At block 615, the embodiment updates the current (mobile device) position according to (the received) sensor data. For example, SRP may use a displacement estimate from a prior position (e.g., the starting position, or any other previously recorded position) to determine the current mobile device position. The current position may be relative to a prior position (for example, a position vector) or as an absolute position (for example, a single position in a coordinate system).

At block 620, the embodiment detects one or more wireless transmitters. SRP may perform intermittent or scheduled radio frequency scans of a mobile device's environment to detect nearby transmitters and their associated RF signals. SRP may identify wireless transmitters by a radio signal identifier (RSI) that may be unique to each respective transmitter. For example, a RSI may be an AP's MAC address, or other broadcast beacon.

At block 625, the embodiment performs range measurement and associates the range measurement with its respective RSI. The range measurement may be determined according to measurement of one or more characteristics of radio signal(s) received from the wireless transmitter(s) detected at block 620. For example, the measurement characteristics may be RSSI, RTT, TDOA, TOA, or other radio signal measurement. The range measurement may represent a physical distance between the transmitter (for example, source of the radio signal to be analyzed/measured) and the mobile device receiving the radio signal. In some embodiments, the current/present range measurement processed by the mobile device is classified as a sample range measurement, while historical or stored range measurements that occurred in previous SRP iterations or prior moments in time are classified as reference range measurements. In one embodiment, when a radio signal from a transmitter is detected, the resulting range measurement and measured characteristics of the radio signal (e.g., RSSI, RTT, TDOA, TOA, or other measurement) used to determine the range measurement are associated with the detected transmitter for future reference. SRP can store the detected transmitter identification (e.g., RSI, or other unique identifier), current mobile device position from block 615, RF signal from block 620, range measurement, and measurement characteristics used to determine the range measurement within memory (for example, memory 205) of the mobile device. SRP may reference the stored range measurements and characteristics when comparing a data for a particular wireless transmitter.

At block 630, the embodiment determines whether a prior (reference) range measurement exists (for a particular transmitter). For example, a range measurement from a mobile to the same currently detected transmitter may be saved to the mobile device as a reference range measurement. In one embodiment, SRP searches the mobile device memory for the RSI detected at block 620.

At block 635, the embodiment is unable to find a prior record of the current RSI. For example, SRP determines the RSI detected at block 620 is newly discovered because no prior record of the transmitter exists. SRP can use the current/sample (i.e., most recently obtained) range measurement (for example, the range measurement of block 625) to estimate the distance between the mobile device and the discovered transmitter. SRP can also associate the range measurement with the current mobile device position (for example, SLAM update according to the position determined at block 615) if the association has not been previously performed. In response to associating the current mobile device position (for example, the position determined at block 615) with the current or sample range measurement (for example, the range measurement of block 625), SRP can continue to receive (for example, block 610) and process the incoming sensor data stream(s) to update (for example, in real-time) the current position (of the mobile device) at block 615.

At block 645, the embodiment compares prior determined range measurements of the transmitter (for example, reference range measurements) with the current (for example, sample) range measurement. Range measurements may be compared in order to determine a change in position of the mobile device from the previous range measurement. In some embodiments, instead of or in addition to comparing reference to sample range measurements, SRP may compare one or more radio signal characteristics. For example, SRP may compare the characteristics used to determine the reference range measurements to the characteristics used to determine the sample range measurements.

At block 650, the embodiment determines, in response to comparing range measurements for the respective RSI, whether the current or sample range measurement (for example, the range measurement of block 625) is within a threshold difference or variance with one or more prior range measurements (for example, reference range measurements determined and saved to memory from prior iterations of SRP). The embodiment determines if the result from the comparison is within a threshold of potential range measurements likely recorded from the same or similar mobile device positions (for example, the position determined at block 615). For example, SRP at block 645 may determine that range measurement "X" is within a threshold variation or difference to range measurement "Y." Range measurement "X" may have an associated mobile device position "A", while range measurement "Y" may have an associated mobile device position "B". If range measurements "X" and "Y" are an approximate match, SRP may assume positions "A" and "B" are also approximate matches. Therefore, depending on the closeness of the match to a prior (for example, reference) range measurement, SRP may replace the current mobile device position with an associated prior (for example, reference) mobile device position.

At block 655, the embodiment, in response to the result of the comparison being outside of a predetermined threshold difference or variation (for example, the match was not approximate enough to meet a predetermined threshold), updates the current mobile device position according to the range measurement difference between a current range measurement and a prior (for example, reference) range measurement. In some embodiments, SRP can determine the prior (for example, reference) range measurement is within a close temporal proximity to the current range measurement (for example, the immediately preceding range measurement). For example, SRP can track the difference in estimated distance traveled by the mobile device according to the change in range estimates provided by measuring nearby RF signals from transmitters. SRP can refer to the last known range measurement to calculate a difference between a current range measurement and the previous range measurement. SRP can calculate the change in perceived distance from the prior range measurement to the current range measurement together to estimate distance traveled for a particular timeframe. For example, the timeframe may begin with measurement of RF signal used to calculate the previous range measurement. The end of the timeframe may be defined by the measurement of the RF signal used to calculate a current range measurement to the same transmitter. SRP can compare the estimated distance traveled that is calculated from range measurement comparisons/differences to the displacement estimate calculated by the mobile device motion sensors. If the mobile device motion sensor based estimation of position and range measurement estimated distance traveled are outside of (for example, beyond) a threshold difference, SRP can use the range measurement estimated distance traveled as the basis to correct/update the current mobile device position. For example, if the estimated distance traveled, as determined from comparing range measurements, is 10 feet, and the motion sensors determine a displacement estimate of 8 feet, SRP can replace the estimated distance with the 10 feet determined from range measurements. In other embodiments, instead of direct replacement, SRP may calculate an average or other formula for combining both distance estimates into a final combined distance estimate. SRP can translate the distance estimates from a prior estimated mobile position into a current mobile device position within a predetermined location map, or a position within an arbitrarily initialized coordinate system. Updating the displacement estimate can result in more accurate mobile device position.

At block 660, the embodiment determines the result of the comparison is within a threshold difference or variation and replaces the current mobile device position (for example, the position determined at block 615) with the prior (for example, reference) mobile device position associated with the matching reference range measurement. For example, position "A" and position "B" are estimated positions calculated from mobile device motion sensor data calculated at time "C" and time "D" respectively, where time "D" is a later point in time than time "C". SRP can replace the mobile device position "B" calculated at a later time than the mobile device position "A" with the mobile device position "B." Replacement of the mobile device position can increase accuracy by reducing or eliminating the accumulation/addition of sensor drift error caused by dead reckoning positioning estimates over time. In one embodiment, replacement of currently estimated positions (for example, the position determined at block 615) with prior recorded mobile device positions increases accuracy of mobile device positioning by minimizing or eliminating drift errors that are introduced while performing dead reckoning with motion sensors. In one embodiment, SRP utilizes the range measurement between a mobile device and a transmitter in a location as a marker or anchor for motion sensor based position. The marker or anchor can indicate to SRP when a mobile device has returned to a specific position where a reference range measurement was previously determined (e.g., a previously visited position, or reference position).

Figure 7:
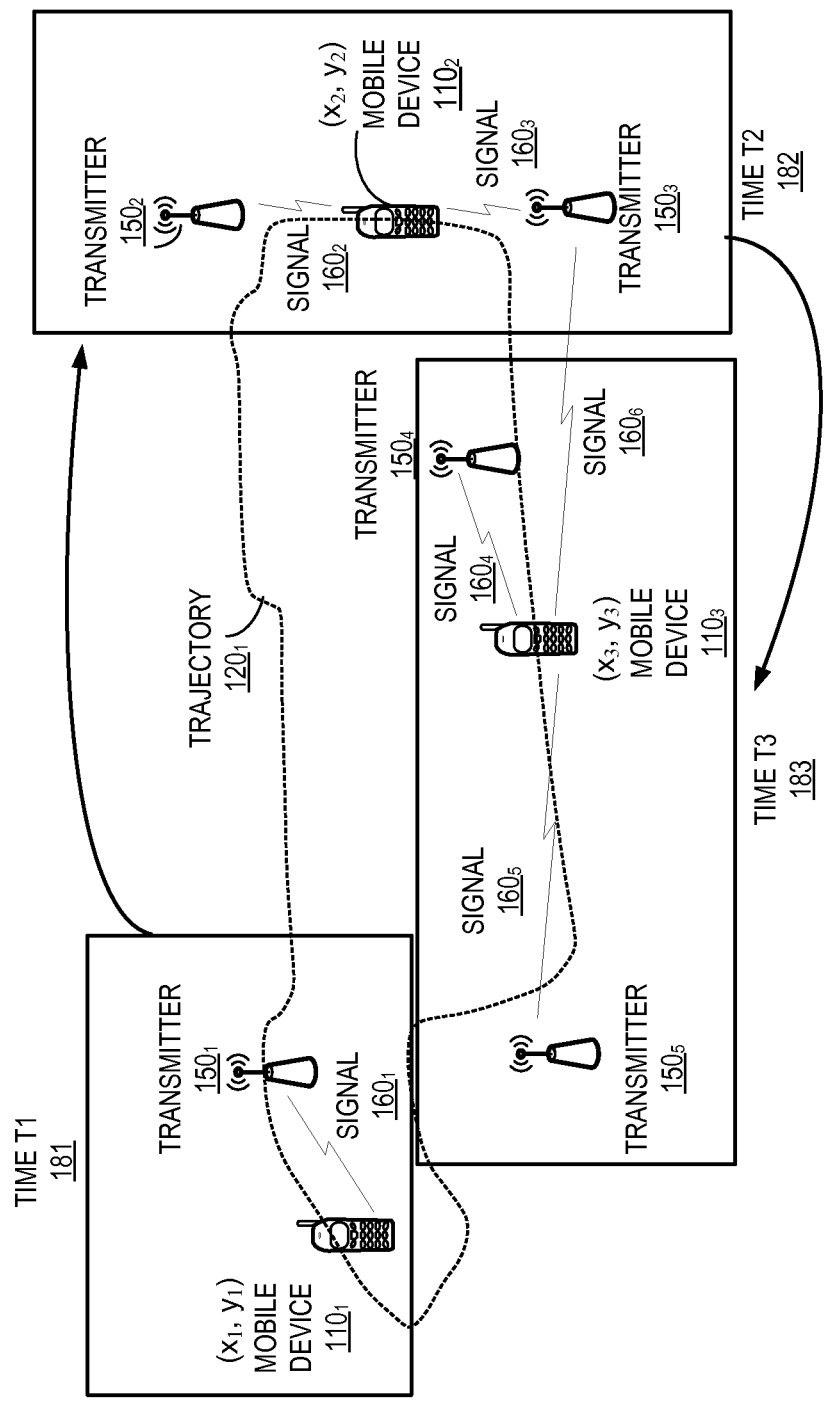
FIG. 7 illustrates positioning of a mobile device at three distinct moments in time, in one embodiment.

FIG. 7 illustrates positioning of a mobile device at three distinct moments in time, in one embodiment. In one embodiment, range measurements to transmitters detected by the mobile device while within a location (for example, along trajectory $120_1$) provide reference measurements used to correct/update mobile device position and eliminate drift errors.

As illustrated in FIG. 7, at time T1 181, the mobile device (for example, illustrated as mobile device $110_1$) at coordinates $(x_1, y_1)$ receives a radio signal $160_1$ from transmitter $150_1$. Coordinates $(x_1, y_1)$ illustrated in FIG. 7 may represent one of many points visited by the mobile device as it traverses a location. Coordinates $(x_1, y_1)$ may be the first in a series of coordinates (for example, an initialized starting position). Alternatively, or coordinates $(x_1, y_1)$, may be preceded by other prior coordinates tracked or recorded by SRP. For example, coordinates $(x_1, y_1)$ may be estimated coordinates resulting from mobile device sensor measurements relative to another prior location. In one embodiment, in response to receiving a RF signal from a transmitter (e.g., transmitters $150_1$ to $150_5$), the mobile device may perform range measurements and record the results to memory of the mobile device 110. In one embodiment, range measurements may operate independently from and in parallel (for example, in an overlapping operating manner) with sensor measurements to track trajectory of the mobile device. For example, the mobile device sensors may be leveraged for PDR.

As illustrated in FIG. 7, at time T2 182, the mobile device (for example, illustrated as mobile device $110_2$) at coordinates $(x_2, y_2)$ may receive a radio signal $160_2$ from transmitter $150_2$ and radio signal $160_3$ from transmitter $150_3$. Coordinates $(x_2, y_2)$ may represent estimated coordinates calculated from motion sensor based displacement estimates from prior estimated coordinates $(x_1, y_1)$. As discussed above coordinates $(x_1, y_1)$ may be arbitrarily initialized coordinates, user input coordinates, GNSS derived coordinates, or merely one set of coordinates in a set of coordinates traversed by the mobile device.

As illustrated in FIG. 7, at time T3 183, mobile device (for example, illustrated as mobile device $110_3$) at coordinates $(x_3, y_3)$ may receive a radio signal $160_4$ from transmitter $150_4$, radio signal $160_5$ from transmitter $150_5$, and radio signal $160_6$ from transmitter $150_3$. Coordinates $(x_3, y_3)$ may represent estimated coordinates calculated from motion sensor based displacement estimates from prior estimated coordinates $(x_2, y_2)$. In one embodiment, at time T3, SRP can detect that transmitter $150_3$ was detected in the prior reference measurement and SRP can determine an estimated distance traveled according to the change in range measurement from signal $160_3$ to $160_6$. SRP can compare the estimated distance from the range measurements to the displacement estimate obtained from the motion sensors and correct any drift error as appropriate.

Figure 8:
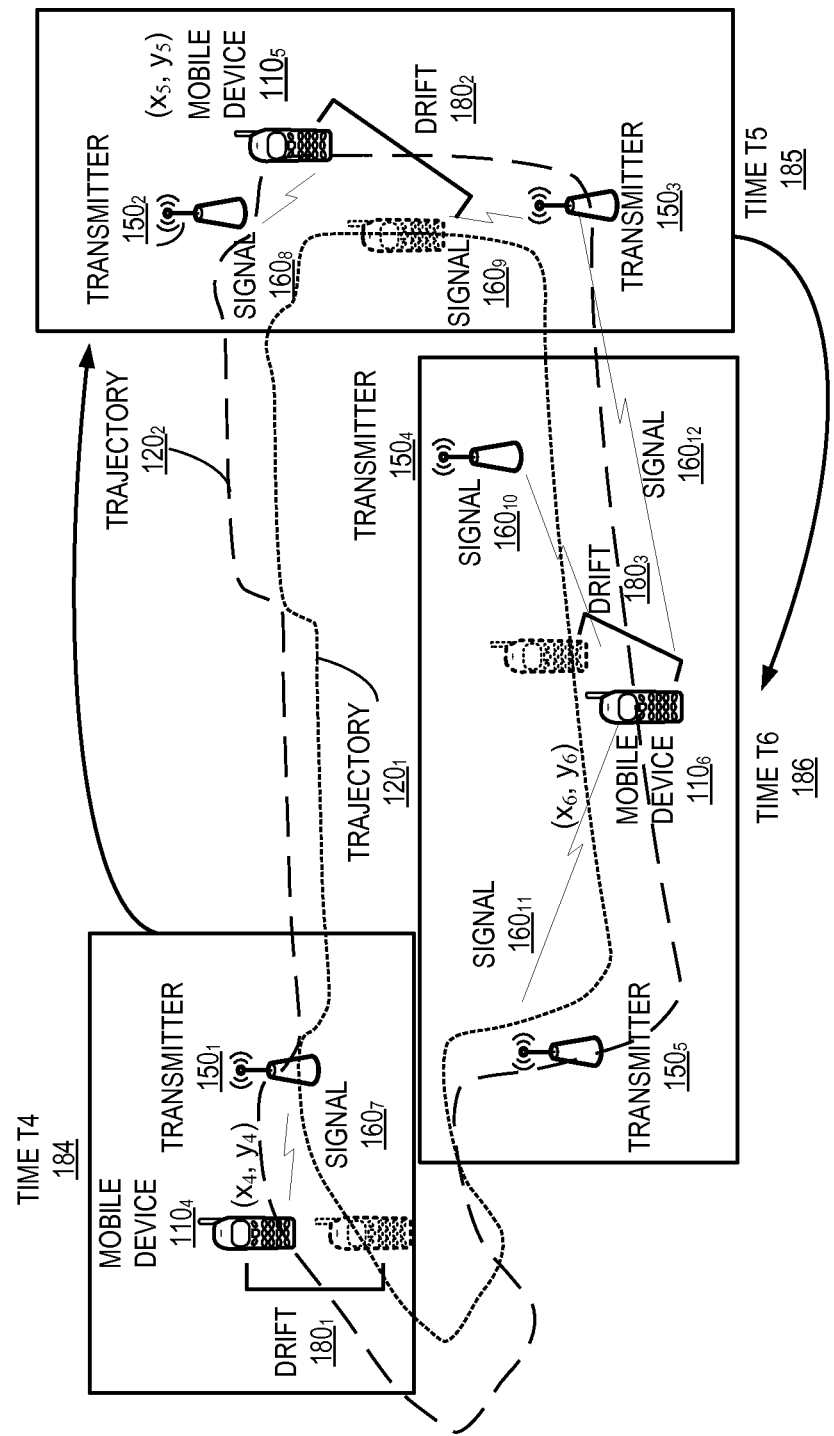
FIG. 8 illustrates positioning of a mobile device at another three distinct moments in time, in one embodiment.

FIG. 8 illustrates positioning of a mobile device at another three distinct moments in time, in one embodiment. FIG. 8 illustrates a mobile device leveraging PDR to track a device positioning (for example, trajectory $120_2$) through an environment subject to compounded errors, or "drift" accumulated after sensor based tracking of a prior trajectory $120_1$. Mobile device tracking errors may compound when relying strictly on mobile device sensors for tracking and positioning. Tracking errors, if left uncorrected, can negatively impact a user's experience with indoor positioning.

As illustrated in FIG. 8, at time T4 184 which occurs after time T1-T3 illustrated in FIG. 7, the mobile device (for example, illustrated as mobile device $110_4$) SRP estimates the current position of the mobile device to be coordinates $(x_4, y_4)$. Coordinates $(x_4, y_4)$ may be determined from motion sensor based tracking first initiated at time T1. At time T4, the mobile device may receive a radio signal $160_7$ from transmitter $150_1$ which is determined to have a range measurement within a threshold difference or variance to a range measurement of radio signal $160_1$ received at time T1. Therefore, because the radio signal's range measurements are determined to be similar or the same as the radio signal $160_1$, SRP can replace the coordinates $(x_4, y_4)$ with the coordinates $(x_1, y_1)$ estimated previously at time T1. By replacing or updating the coordinates, SRP eliminates the error drift $181_1$ that may have occurred since time T1.

At time T5 185, which also occurs after time T1-T3 illustrated in FIG. 7, and also occurs after time T4, the mobile device (for example, illustrated as mobile device $110_5$) has motion sensor estimated coordinates $(x_5, y_5)$ as determined from sensor based tracking first initiated at time T1. At time T5, the mobile device may receive radio signals $160_8$ and $160_9$ from transmitters $150_2$ and $150_3$ respectively. If the range measurements from the signals are within a predetermined threshold difference or variation, SRP can replace the coordinates $(x_5, y_5)$ with the coordinates $(x_2, y_2)$ estimated previously at time T2. By replacing or updating the coordinates, SRP eliminates the error drift $181_2$ that may have occurred since time T2.

At time T6 186, which also occurs after time T1-T3 illustrated in FIG. 7, the mobile device (for example, illustrated as mobile device $110_6$) has associated coordinates $(x_6, y_6)$ as determined from sensor based tracking first initiated at time T1. At time T6, the mobile device may receive radio signals $160_{10}$ and $160_{11}$ from transmitters $150_4$ and $150_5$ respectively. If the range measurements from the signals are within a predetermined threshold difference or variation, SRP can replace the coordinates $(x_6, y_6)$ with the coordinates $(x_3, y_3)$ estimated previously at time T3. By replacing or updating the coordinates, SRP eliminates the error drift $181_3$ that may have occurred since time T3. In one embodiment, if the range measurement is not within a threshold difference SRP may detect that transmitter $150_3$ was detected in the prior reference range measurement and SRP can determine an estimated distance traveled according to the change in range measurement from signal $160_9$ to $160_{12}$. SRP can compare the estimated distance from the range measurements to the displacement estimate obtained from the motion sensors and correct any drift error as appropriate.

Those of skill would appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one embodiment, the previous SRP description may be implemented by one or more general purpose processors (for example, device processor 201) and in memory (for example, device memory 205) to achieve the previously desired functions (e.g., the methods of FIG. 5, and FIG. 6).

In one or more exemplary embodiments, the functions or modules described may be implemented in hardware (for example, device hardware 110), software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the embodiments described herein. Various modifications to these embodiments will be readily apparent to those skilled in the art, and the generic principles defined herein may be applied to other embodiments without departing from the spirit or scope of the embodiments described herein. Thus, the embodiments described herein are not intended to be limited, and is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments described herein. As used herein, the singular forms "a", "an", and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (for example, application specific integrated circuits), by program instructions being executed by one or more processors (for example, executable program instructions), or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of SRP described herein may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

What is claimed is:

1. A method for mobile device positioning, the method comprising:
    receiving a reference radio signal from a transmitter with unknown absolute position;
    measuring at least one characteristic of the reference radio signal;
    calculating a reference range measurement between a mobile device and the transmitter using the at least one characteristic of the reference radio signal;
    receiving mobile device motion sensor data;
    estimating a position of the mobile device based on the mobile device motion sensor data;
    receiving a sample radio signal from the transmitter with unknown absolute position;
    measuring at least one characteristic of the sample radio signal;
    calculating a sample range measurement between the mobile device and the transmitter using the at least one characteristic of the sample radio signal;
    comparing the reference range measurement to the sample range measurement; and
    adjusting the estimated motion sensor based position of the mobile device according to a result of comparing the reference range measurement to the sample range measurement.

2. The method of claim 1, wherein the result of the comparison is an estimated change in relative position of the mobile device based on a difference between the reference range measurement and the sample range measurement.

3. The method of claim 1, wherein the adjusting further comprises:
    replacing, in response to determining the reference range measurement matches the sample range measurement to within a threshold difference, the estimated motion sensor based position of the mobile device with a reference position associated with the matching reference radio signal.

4. The method of claim 1, wherein the estimated motion sensor based position is a dead reckoning based calculation relative to a prior determined mobile device position.

5. The method of claim 1, further comprising:
    initializing a starting position of the mobile device before estimating the motion sensor based position of the mobile device, wherein the starting position comprises:
    an arbitrarily assigned starting position, or
    a last known position determined from a source other than the mobile device motion sensor.

6. The method of claim 5, wherein the source comprises a global navigation satellite system or an indoor positioning system.

7. The method of claim 1, further comprising:
    receiving alignment data at the mobile device, wherein the alignment data comprises at least one of: a plurality of geographically referenced points, or a geographically referenced point and an orientation of the mobile device at the geographically referenced point; and
    aligning, in response to receiving the alignment data, a local map on the mobile device to a reference map comprising a plurality of geographically referenced points.

8. The method of claim 1, further comprising:
    estimating, according to one or more received radio signals from the transmitter, a position of the transmitter relative to the mobile device; and
    modifying, in response to updating the motion sensor based position of the mobile device, a local map on the mobile device, wherein the local map comprises a plurality of relative transmitter positions.

9. The method of claim 8, wherein the one or more received radio signals comprises the reference radio signal and the sample radio signal.

10. The method of claim 1, wherein the mobile device motion sensor comprises at least one of: accelerometer, magnetometer, gyroscope, or any combination thereof, and wherein the transmitter is at least one of: a WiFi access point, Bluetooth transmitter, or a combination thereof.

11. The method of claim 1, wherein the measuring at least one characteristic of the reference radio signal or at least one characteristic of the sample radio signal further comprises:
    determining, for a respective radio signal, at least one of: time of arrival (TOA), time difference of arrival (TDOA), round trip time (RTT), received signal strength indicator (RSSI), or any combination thereof.

12. A mobile device comprising:
    a processor; and
    a storage device coupled to the processor and configurable for storing instructions, which, when executed by the processor, cause the processor to:
    receive a reference radio signal from a transmitter with unknown absolute position;
    measure at least one characteristic of the reference radio signal;

calculate a reference range measurement between the mobile device and the transmitter using the at least one characteristic of the reference radio signal;

receive mobile device motion sensor data;

estimate a position of the mobile device based on the mobile device motion sensor data;

receive a sample radio signal from the transmitter with unknown absolute position;

measure at least one characteristic of the sample radio signal;

calculate a sample range measurement between the mobile device and the transmitter using the at least one characteristic of the sample radio signal;

compare the reference range measurement to the sample range measurement; and adjust the estimated motion sensor based position of the mobile device according to a result of the comparing the reference range measurement to the sample range measurement.

13. The mobile device of claim 12, wherein the result of the comparison is an estimated change in relative position of the mobile device based on a difference between the reference range measurement and the sample range measurement.

14. The mobile device of claim 12, wherein the instructions, which, when executed by the processor, cause the processor to adjust the estimated motion sensor based position of the mobile device comprise instructions to:

replace, in response to determining the reference range measurement matches the sample range measurement to within a threshold difference, the estimated motion sensor based position of the mobile device with a reference position associated with the matching reference radio signal.

15. The mobile device of claim 12, wherein the estimated motion sensor based position is a dead reckoning based calculation relative to a prior determined mobile device position.

16. The mobile device of claim 12, further comprising instructions, which, when executed by the processor, cause the processor to:

initialize a starting position of the mobile device before estimating the motion sensor based position of the mobile device, wherein the starting position comprises:
an arbitrarily assigned starting position, or
a last known position determined from a source other than the mobile device motion sensor.

17. The mobile device of claim 16, wherein the source comprises a global navigation satellite system or an indoor positioning system.

18. The mobile device of claim 12, further comprising instructions, which, when executed by the processor, cause the processor to:

receive alignment data at the mobile device, wherein the alignment data comprises at least one of: a plurality of geographically referenced points, or a geographically referenced point and an orientation of the mobile device at the geographically referenced point; and align, in response to receiving the alignment data, a local map on the mobile device to a reference map comprising a plurality of geographically referenced points.

19. The mobile device of claim 12, further comprising instructions, which, when executed by the processor, cause the processor to:

estimate, according to one or more received radio signals from the transmitter, a position of the transmitter relative to the mobile device; and modify, in response to updating the motion sensor based position of the mobile device, a local map on the mobile device, wherein the local map comprises a plurality of relative transmitter positions.

20. The mobile device of claim 19, wherein the one or more received radio signals comprises the reference radio signal and the sample radio signal.

21. The mobile device of claim 12, wherein the mobile device motion sensor comprises at least one of: accelerometer, magnetometer, gyroscope, or any combination thereof, and wherein the transmitter is at least one of a WiFi access point, Bluetooth transmitter, or a combination thereof.

22. The mobile device of claim 12, wherein the instructions, which, when executed by the processor, cause the processor to measure at least one characteristic of the reference radio signal or to measure at least one characteristic of the sample radio signal comprise instructions to:

determine, for a respective radio signal, at least one of: time of arrival (TOA), time difference of arrival (TDOA), round trip time (RTT), received signal strength indicator (RSSI), or any combination thereof.

23. An apparatus for mobile device positioning, the apparatus comprising:

means for receiving a reference radio signal from a transmitter with unknown absolute position;

means for measuring at least one characteristic of the reference radio signal;

means for calculating a reference range measurement between a mobile device and the transmitter using the at least one characteristic of the reference radio signal;

means for receiving mobile device motion sensor data;

means for estimating a position of the mobile device based on the mobile device motion sensor data;

means for receiving a sample radio signal from the transmitter with unknown absolute position;

means for measuring at least one characteristic of the sample radio signal;

means for calculating a sample range measurement between the mobile device and the transmitter using the at least one characteristic of the sample radio signal;

means for comparing the reference range measurement to the sample range measurement; and means for adjusting the estimated motion sensor based position of the mobile device according to a result of comparing the reference range measurement to the sample range measurement.

24. The apparatus of claim 23, wherein the result of the comparison is an estimated change in relative position of the mobile device based on a difference between the reference range measurement and the sample range measurement.

25. The apparatus of claim 23, wherein the means for adjusting comprises:

means for replacing, in response to determining the reference range measurement matches the sample range measurement to within a threshold difference, the estimated motion sensor based position of the mobile device with a reference position associated with the matching reference radio signal.

26. The apparatus of claim 23, wherein the estimated motion sensor based position is a dead reckoning based calculation relative to a prior determined mobile device position.

27. The apparatus of claim 23, further comprising:

means for initializing a starting position of the mobile device before estimating the motion sensor based position of the mobile device, wherein the starting position comprises:

an arbitrarily assigned starting position, or
a last known position determined from a source other than the mobile device motion sensor.

28. The apparatus of claim 27, wherein the source comprises a global navigation satellite system or an indoor positioning system.

29. The apparatus of claim 23, further comprising:
means for receiving alignment data at the mobile device, wherein the alignment data comprises at least one of: a plurality of geographically referenced points, or a geographically referenced point and an orientation of the mobile device at the geographically referenced point; and
means for aligning, in response to receiving the alignment data, a local map on the mobile device to a reference map comprising a plurality of geographically referenced points.

30. The apparatus of claim 23, further comprising:
means for estimating, according to one or more received radio signals from the transmitter, a position of the transmitter relative to the mobile device; and
means for modifying, in response to updating the motion sensor based position of the mobile device, a local map on the mobile device, wherein the local map comprises a plurality of relative transmitter positions.

31. The apparatus of claim 30, wherein the one or more received radio signals comprises the reference radio signal and the sample radio signal.

32. The apparatus of claim 23, wherein the mobile device motion sensor comprises at least one of: accelerometer, magnetometer, gyroscope, or any combination thereof, and wherein the transmitter is at least one of a WiFi access point, Bluetooth transmitter, or a combination thereof.

33. The apparatus of claim 23, wherein the means for measuring at least one characteristic of the reference radio signal or the means for measuring at least one characteristic of the sample radio signal further comprises:
means for determining, for a respective radio signal, at least one of: time of arrival (TOA), time difference of arrival (TDOA), round trip time (RTT), received signal strength indicator (RSSI), or any combination thereof.

34. A machine readable non-transitory storage medium storing executable program instructions which, when executed by a processor in a mobile device, cause the mobile device to perform a method for mobile device positioning, the method comprising:
receiving a reference radio signal from a transmitter with unknown absolute position;
measuring at least one characteristic of the reference radio signal;
calculating a reference range measurement between a mobile device and the transmitter using the at least one characteristic of the reference radio signal;
receiving mobile device motion sensor data;
estimating a position of the mobile device based on the mobile device motion sensor data;
receiving a sample radio signal from the transmitter with unknown absolute position;
measuring at least one characteristic of the sample radio signal;
calculating a sample range measurement between the mobile device and the transmitter using the at least one characteristic of the sample radio signal;
comparing the reference range measurement to the sample range measurement; and
adjusting the estimated motion sensor based position of the mobile device according to a result of comparing the reference range measurement to the sample range measurement.

35. The medium of claim 34, wherein the result of the comparison is an estimated change in relative position of the mobile device based on a difference between the reference range measurement and the sample range measurement.

36. The medium of claim 34, wherein the adjusting comprises:
replacing, in response to determining the reference range measurement matches the sample range measurement to within a threshold difference, the estimated motion sensor based position of the mobile device with a reference position associated with the matching reference radio signal.

37. The medium of claim 34, wherein the estimated motion sensor based position is a dead reckoning based calculation relative to a prior determined mobile device position.

38. The medium of claim 34, the method further comprising:
initializing a starting position of the mobile device before estimating the motion sensor based position of the mobile device, wherein the starting position comprises:
an arbitrarily assigned starting position, or
a last known position determined from a source other than the mobile device motion sensor.

39. The medium of claim 38, wherein the source comprises a global navigation satellite system or an indoor positioning system.

40. The medium of claim 34, the method further comprising:
receiving alignment data at the mobile device, wherein the alignment data comprises at least one of: a plurality of geographically referenced points, or a geographically referenced point and an orientation of the mobile device at the geographically referenced point; and
aligning, in response to receiving the alignment data, a local map on the mobile device to a reference map comprising a plurality of geographically referenced points.

41. The medium of claim 34, wherein the mobile device motion sensor comprises at least one of: accelerometer, magnetometer, gyroscope, or any combination thereof, and wherein the transmitter is at least one of a WiFi access point, Bluetooth transmitter, or a combination thereof.

42. The medium of claim 41, wherein the one or more received radio signals comprises the reference radio signal and the sample radio signal.

43. The medium of claim 34, the method further comprising:
estimating, according to one or more received radio signals from the transmitter, a position of the transmitter relative to the mobile device; and
modifying, in response to updating the motion sensor based position of the mobile device, a local map on the mobile device, wherein the local map comprises a plurality of relative transmitter positions.

44. The medium of claim 34, wherein the measuring at least one characteristic of the reference radio signal or the measuring at least one characteristic of the sample radio signal comprises:
determining, for a respective radio signal, at least one of: time of arrival (TOA), time difference of arrival (TDOA), round trip time (RTT), received signal strength indicator (RSSI), or any combination thereof.

\* \* \* \* \*